April 26, 1955    M. F. RICKENBACK    2,707,015
ANTI-SKID TIRE CHAIN ATTACHMENT
Filed June 14, 1952    2 Sheets-Sheet 1

INVENTOR.
Miriam F. Rickenback
BY W. W. Williamson
ATTORNEY

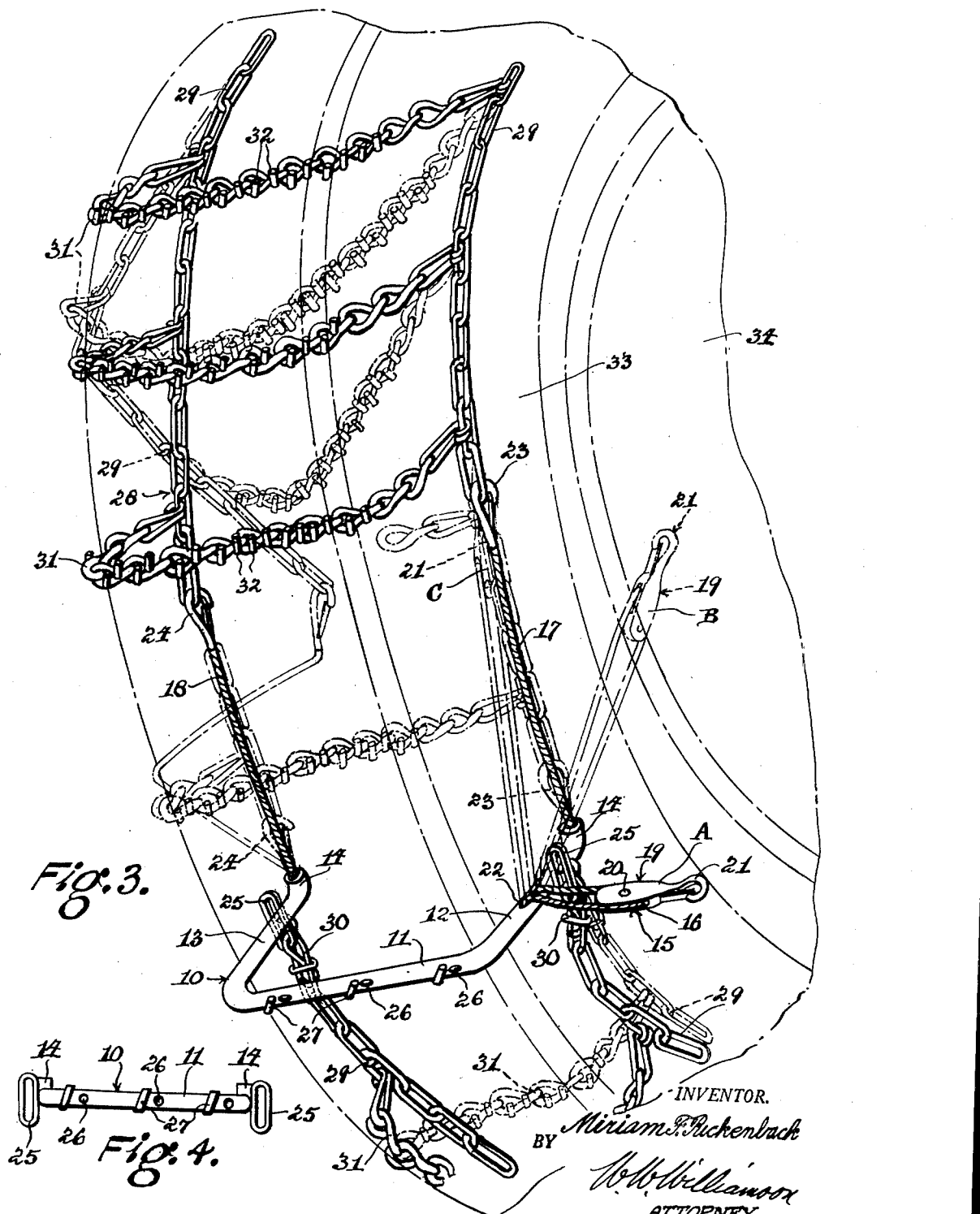

United States Patent Office 2,707,015
Patented Apr. 26, 1955

2,707,015

ANTI-SKID TIRE CHAIN ATTACHMENT

Miriam F. Rickenback, Woodbury, N. J.

Application June 14, 1952, Serial No. 293,630

12 Claims. (Cl. 152—213)

My invention relates to a new and useful anti-skid tire chain attachment and has for one of its objects to produce an attachment which, when connected to a tire chain, will facilitate and expedite the mounting of the chain on a tire, especially either rear tire, to which access is rather difficult on modern cars because of the low hanging apron side of the fender.

Another object of the invention is to provide an attachment of the character mentioned whereby all connections and the mounting of the chain on a tire are accomplished from the outside of a wheel thus eliminating the necessity of the operator assuming a kneeling or recumbent position on the ground.

Another object of this invention is to provide means whereby an operator may substantially simultaneously connect and mount both side chains of an anti-skid tire chain while in a slightly stooped position at the outer or near side of a wheel.

Another object of the present invention is to provide an attachment of the class mentioned which becomes, in effect, a part of the anti-skid chain while in use and functions as one of the cross chains.

In present day or modern cars only a small portion of a rear wheel tire is exposed below its respective car fender and the balance thereof is practically inaccessible making it exceedingly difficult to apply an anti-skid chain thereto unless the operator assumes a recumbent position at one time, to adjust and connect the inner side chain, and a kneeling position at another time, to adjust and connect the outer side chain. Another object of this invention is to overcome the above outlined disadvantages by providing an attachment including an anchoring member for temporary connection to a tire and held in place by friction and the resiliency of the tire and to which the connectors or hooks at one end of the anti-skid chain are fastened, and a folded cable within said anchoring member and of sufficient length to permit the ends thereof to be connected to the opposite end of the anti-skid chain at a location an appreciable distance from the wheel and said opposite end of the anti-skid chain subsequently drawn into place and fastened in operative position by the cable only, through the medium of the anchoring member, when said cable is pulled taut and secured to some appropriate part of the anti-skid chain, as to a link of the outer side chain.

A further object of the invention is to provide an anti-skid tire chain attachment in which portions of the operations of mounting the anti-skid chains on two tires can be performed simultaneously thereby saving considerable time which is highly advantageous during inclement weather.

A still further object of the present invention is to produce an anti-skid tire chain attachment consisting of a generally U-shaped hollow or tubular anchoring member to embrace a tire and be held temporarily in place by friction and/or the compressing effect of said anchoring member on the resilient tire, said member having eyes on the arms thereof adjacent the terminals of said arms to receive the connectors or hooks at one end of an anti-skid chain, and a folded cable, of wire or fibre or an equivalent thereof such as a chain, having the end portions running through the anchoring member with the extremities projecting from the arm terminals and provided with hooks for connection to the other end of the anti-skid chain and the bight of the cable projecting through an opening in one of the arms of the anchoring member, the location of said bight being shifted as the cable is pulled taut by a combination pull and connector mounted on the cable or the latter retracted upon reverse movement thereof.

With the above and other objects in view this invention consists of the details of construction hereinafter set forth and then designated by the claims.

In order that those skilled in the art to which this invention appertains may understand how to make and use the same I will describe its construction in detail referring by numerals to the accompanying drawings forming a part hereof, in which.

Figure 1:
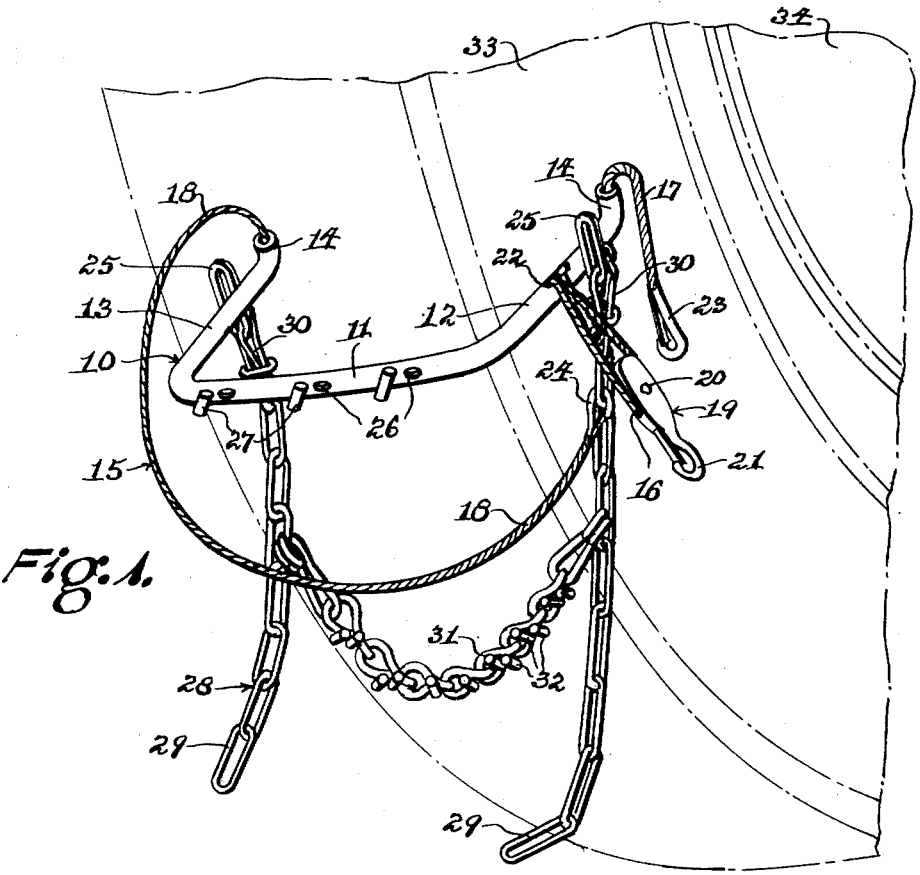
Fig. 1 is a phantom view, in perspective, of a portion of an automobile wheel and tire with the attachment mounted thereon and one end of an anti-skid tire chain connected thereto illustrating the initial operation in mounting a tire chain employing my invention.

Fig. 3 also is a phantom view, in perspective, of a portion of an automobile wheel and tire with both ends of the anti-skid chain connected with the attachment and wrapped around the tire and showing in dot and dash lines several positions of some of the elements during the mounting of the anti-skid chain and also the final assembly of all of the parts.

Fig. 4 is an outer end view of the anchoring member.

In carrying out my invention as herein embodied 10 represents the substantially U-shaped anchoring member of hollow or tubular formation including a cross-piece 11 and a pair of substantially parallel arms 12 and 13, the terminals 14 of which, preferably, project at approximately right angles to the balance of the respective arms. Viewing the wheels from beside the car and considering that the mounting of the chains is partially accomplished by revolving said wheels in the direction of forward travel of the car, which is the most convenient manner of mounting, the angular terminals 14 are to be assumed as projecting forwardly with relation to the anchoring member as a whole whether used on either a right hand or left hand wheel.

A cable 15 of any appropriate material with a minimum amount of expansability and considerable flexibility is doubled upon itself to provide a shiftable bight 16 and two branches 17 and 18. In the bight or loop 16 of the cable 15 is mounted the combination pull and connector 19 comprising a pulley 20, or other anti-friction guide, and a hook 21, preferably of the spring snap variety. The cable branches pass through an opening 22 in the arm 12, which is to be situated at the outer side of the tire and wheel when the device is in use, and one of said branches, as 17, runs through the terminal end portion of the arm 12 and projects from the terminal end of said arm 12 while on the extreme end of the cable branch 17 is a hook 23 also, preferably, of the spring snap type. The other cable branch, as 18, runs through the inner end portion of the arm 12, the cross-piece 11 and the arm 13 and projects from the terminal end of said arm 13 and said cable branch 18 also has a hook 24, preferably of the spring snap type, on the extremity thereof.

On each arm 12, 13 adjacent the terminal end thereof is an eye 25 and the two eyes of a single anchoring member, preferably, are located on the outer sides of their respective arms although it is possible that they be arranged to project from the leading or trailing faces of said arms.

To assist in keeping the interior of the anchoring member in a dry condition said member may be perforated at desirable and suitable locations but, particularly, the cross-piece 11 has a plurality of drainage holes 26 in the outer side thereof so that any water having a tendency to accumulate in the anchoring member will be disgorged by centrifugal force resulting from the revolving of the car wheels. Said cross-piece 11 may, if desired, also have cleats 27 thereon, especially on the outer side thereof, for the well known purpose.

The anti-skid tire chain 28 is of any well known construction and includes the side chains 29 with connectors or hooks 30 at one end and suitably spaced cross chains 31 which may have cleats 32 thereon. This tire chain is to be wrapped around the tire 33 mounted on a wheel 34, said tire and wheel being shown in phantom since they actually do not comprise any part of the invention.

Figure 2:
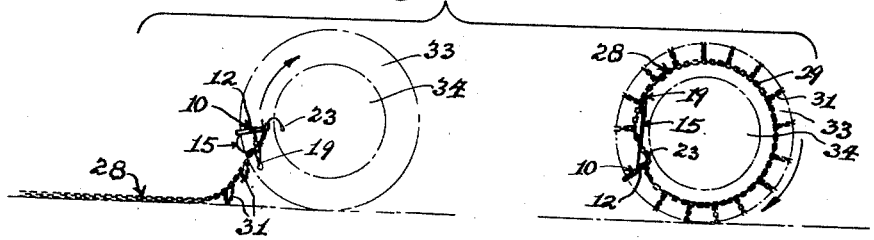
Fig. 2 is a side view of the device in two positions relative to a wheel shown in phantom to illustrate the beginning and completion of the operations for mounting the attachment and anti-skid chain on the wheel.

In mounting a tire chain 28 on a tire by the employment of this attachment, one end of each side chain is secured to the separate arms 12, 13 of the anchoring member, as by connecting the hooks or connectors 30 to the eyes 25 on said arms. The anchoring member 10 is then placed on the tire in a straddling or embracing condition, as shown in Figs. 1 and 3, whereby the cross-piece 11 will be imposed on the circumference of the tire and the arms 12, 13 will snugly engage opposite sides of said tire with the arm 12 positioned on the outer side of the tire. The anchoring member is applied to an exposed portion of the tire just above the ground level and below the fender apron or drop and the tire chain may be laid out in back of the wheel, Fig. 2. As previously stated the anchoring member snugly fits and in fact the space between the arms should be slightly less than the width of the tire so that when assembling the anchoring member on the tire the latter will be compressed a small amount to provide a gripping action sufficiently strong to retain said anchoring member in place even under the strain of pulling the tire chain onto the tire as the wheel is revolved. A convenient way to initially partially wrap the chain around the perimeter of the tire is to drive the car forwardly until the wheel makes one revolution so as to return the anchoring member to the approximate starting position whereby it will again be exposed and easily accessible.

Before the time the wheel is being revolved the inner side branch 18 of the cable 15 may be pulled out and its hook 24 connected to the outer side chain of the tire chain as shown in Fig. 1. This will prevent the parts from becoming entangled and locate the hook 24 in a position readily accessible to the operator. By carrying out the aforementioned operations substantially simultaneously, the operator may observe the position of the attachment on the left hand wheel from the driver's seat and will know that the one on the right hand wheel is in the same relative position. The hook 24 then can be disconnected from its temporary position and fastened to the free end of the inner side chain of the tire chain while said inner side chain is resting on the perimeter of the tire or even hanging over the outer side of said tire. Next the outer side branch 17 of the cable is pulled until its hook 23 can be and is fastened to the free end of the outer side chain of said tire chain, all as shown in full lines in Fig. 3. The pulling of the cable branch 17 out of the anchoring member will shorten the cable branch 18 and draw the free end of the inner side chain over onto the inner side of the tire. When all parts are connected the combination pull and connector 19 will be in the approximate position illustrated at A in Fig. 3. The attachment and tire chain are now ready to be finally fixed in position and by pulling outwardly on said combination pull and connector 19 until the approximate position designated B the hooks 23, 24 will be drawn to the terminals 14 and the tire chain will be taut. Finally, the combination pull and connector 19 is fastened to a link of the outer side chain of the tire chain as shown at C the location of which will be some distance from the anchoring member as will be apparent from the right hand illustration of Fig. 2 but during the attaching operation said location C will be below the apron or drop of the car fender and readily accessible.

To dismount the tire chain it is only necessary to release the combination pull and connector 19 from the tire side chain and slacken the cable which will permit the tire chain to be pulled over the tire until access is had to the hook 24. Upon disconnection of both hooks 23 and 24 the car may be driven forwardly or backwardly so the tire chain will fall off and the wheel moved beyond said tire chain. The attachment can then be removed and the whole apparatus stored as a unit.

Of course I do not wish to be limited to the exact details of construction herein shown and described as these may be varied within the scope of the appended claims without departing from the spirit of my invention.

Having described my invention what I claim as new and useful is:

1. An anti-skid tire chain attachment comprising a rigid tubular anchoring member adapted to embrace a portion of a tire and to which one end of a tire chain is adapted to be temporarily connected, said anchoring member to remain in place on the tire as long as the chain is employed, extensible flexible means slidable within said anchoring member and having two ends and an intermediate loop projecting from and exposed outside of said anchoring member, said ends adapted to be temporarily connected to the other end of the tire chain and manually retracted by pulling upon the loop to draw said other end of said tire chain towards said anchoring member and thereby tighten the tire chain about the tire, and a single attaching means shiftably mounted on the loop of the extensible flexible means to be attached at a single location on the tire chain for holding said extensible flexible means retracted and taut.

2. A tire chain attachment adapted for utilization in expeditiously mounting a tire chain on a tire, drawing the ends of the tire chain towards one another and holding such chain taut in place on the tire, comprising an anchoring member consisting of a cross-piece and a pair of substantially parallel arms projecting from said cross-piece, said anchoring member to be placed on the tire in embracing gripping relation thereto with the cross-piece extending crosswise of the perimeter and the arms radially of the sides of said tire, one end of the tire chain to be connected to said anchoring member, a folded cable providing two branches guided by the anchoring member and said branches having means whereby said branches may be connected to the other end of the tire chain at a distance away from the side of the vehicle on which the tire is mounted, the fold of the cable adapted to be pulled to retract the branch ends into the anchoring member for bringing the ends of the tire chain close together and tightening said tire chain on the tire, and means on said cable to be fastened to the tire chain for holding the latter taut.

3. A tire chain attachment according to claim 2 wherein the arms of the anchoring member have eyes thereon adjacent the terminals thereof to receive the side chain hooks or connectors at one end of the tire chain.

4. The tire chain attachment according to claim 2 wherein the means on the cable for holding it taut is a combination pull and connector comprising an element engaging the shiftable bight of said cable and a hook.

5. A tire chain attachment adapted for use in mounting a tire chain on a tire from the outer side of a wheel adjacent the ground level, drawing the ends of the tire chain into proximity to one another and holding said tire chain taut in place on the tire, comprising a hollow anchoring member to be placed on the tire in embracing gripping relation thereto, said anchoring member including a cross-piece and a pair of arms projecting from said cross-piece in substantially parallel relation to each other, said cross-piece lying transversely across the tire perimeter with the arms engaging the side walls of said tire, one end of the tire chain to be connected to said anchoring member, and a folded cable including two branches and a shiftable bight, the said branches threaded through an opening in the anchoring member arm located on the outer side of the tire and one branch passing through the terminal end of said outer arm with the other branch passing through the other end portion of said outer arm, the cross-piece and the opposite or inner arm, said branches projecting from the terminals of the respective arms and having connectors on the extremities for fastening to the other end of the tire chain and be drawn towards the first mentioned end of the tire chain as the cable is manually drawn up by pulling on the shiftable cable bight.

6. The structure according to claim 5 wherein the terminals of the anchoring member arms project forwardly relative to the direction of travel of the device on a forwardly traveling wheel.

7. The structure according to claim 5 wherein the opening in the outer side arm for the cable is in the leading side of said arm relative to a forwardly traveling wheel.

8. The structure according to claim 5 wherein the anchoring member has drainage holes therein.

9. The structure according to claim 5 wherein the cross-piece has drainage holes in the outer surface thereof whereby centrifugal force will drain a liquid from the anchoring member.

10. The structure according to claim 5, in combination with eyes on the anchoring member arms adjacent their outer ends to receive connectors on the side chains at one end of the tire chain.

11. The structure according to claim 5, in combination with a combined pull and connector consisting of a pulley mounted in the shiftable cable bight and a hook to fasten to a portion of the tire chain to hold the latter in a taut condition.

12. As an article of manufacture, a tire chain attachment comprising a generally U-shaped hollow anchoring member including a cross-piece and substantially parallel arms projecting from said cross-piece with the terminals of said arms constantly open, a doubled cable consisting of two branches and a shiftable bight, said cable branches threaded through an opening in one of the arms and through the separate arms and projecting from the terminals of said arms with the bight outside of the anchoring member, spring snap hooks on the extremities of said cable branches, and a combined pull and connector mounted on the inside of the shiftable cable bight whereby the branches may be retracted or drawn into and partially through the anchoring member and fastened in the retracted position.

References Cited in the file of this patent

UNITED STATES PATENTS

| | | |
|---|---|---|
| 1,571,764 | Edwards | Feb. 2, 1926 |
| 2,500,373 | O'Connor | Mar. 14, 1950 |
| 2,646,099 | Johnson | July 21, 1953 |